Figure 1:
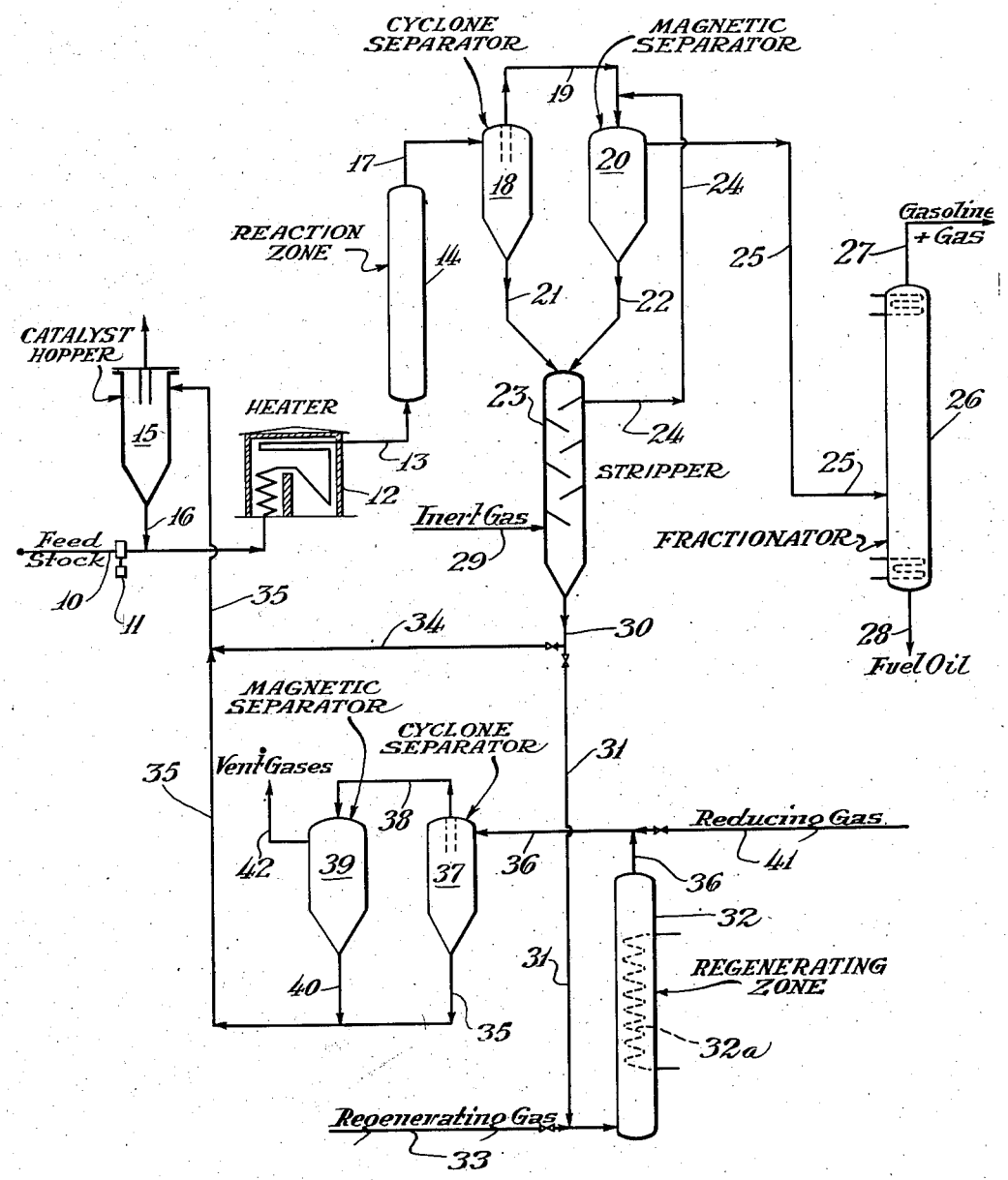

May 9, 1944. W. G. ROESCH ET AL 2,348,418
CATALYTIC PROCESS
Filed Nov. 20, 1940 2 Sheets-Sheet 2

Inventors:
Frank G. Brueckmann
Willard G. Roesch
By Vanderveer Voorhees
Attorney.

Patented May 9, 1944

2,348,418

UNITED STATES PATENT OFFICE 2,348,418

CATALYTIC PROCESS

Willard G. Roesch and Frank G. Brueckmann, Hammond, Ind., assignors to Standard Oil Company, Chicago, Ill., a corporation of Indiana Application November 20, 1940, Serial No. 366,366

7 Claims. (Cl. 196—52)

This invention relates to the treatment of gases and vapors with solid highly dispersed powdered catalysts wherein the catalysts are suspended in the vapors and subsequently separated therefrom. More specifically, it relates to the conversion of hydrocarbon oils with catalysts, more particularly to the cracking of heavier hydrocarbon oils and the catalytic reforming of gasoline and low knock rating naphtha by contacting with powdered solid refractory catalysts in the vapor phase for the production of high knock rating gasoline.

An object of the invention is to facilitate the handling and recovery of catalysts in powdered catalyst treating systems where a part or all of the finely divided catalyst is suspended in the gases from which it is difficult to separate the catalyst because of the high state of subdivision.

In catalytic processes heretofore it has been very difficult to recover all the powdered catalyst from vapors in which the catalyst is suspended. In catalytic cracking, for example, it has been especially difficult to recover the catalyst completely from regeneration gases in a process where the catalyst is regenerated and recycled to the treating step. Large volumes of regeneration gases are required for the purpose and although efficient cyclone separators and even electrical precipitators have been employed in the recovery of the catalyst from the spent gases, there has been an inevitable loss of catalyst, more particularly the very finely divided portion of the catalyst. The amount of loss occurring after separation in a highly efficient cyclone separator may be of the order of 1 to 5% or even more, per cycle, an amount which greatly increases the catalyst cost in an operation where large volumes of catalysts must be recycled to the process.

In the cracking of gas oil, for example, the amount of catalyst which must be employed is commonly about 2 to 3 times the weight of the oil treated. Only by efficient recovery of the catalyst and recycling can the process be made to operate economically and this is especially true in the case of the more expensive synthetic catalysts, for instance, those of the silica-alumina and silica-magnesia types. Likewise, in the reforming of low knock rating naphthas with chromium or molybdenum catalysts and particularly with chromium oxide or molybdenum oxide on alumina, generally in the presence of hydrogen, it is imperative that a high recovery of catalyst be obtained.

According to our process, we recover catalysts from the gases by employing catalysts which have a high magnetic susceptibility and recover the catalysts by means of a magnetic separator to which the gases and accompanying catalyst are subjected before discharging from the process. The catalyst recovered in this way is especially valuable in the process because of its unusually fine state of subdivision which enhances its catalytic activity.

Figure 2:
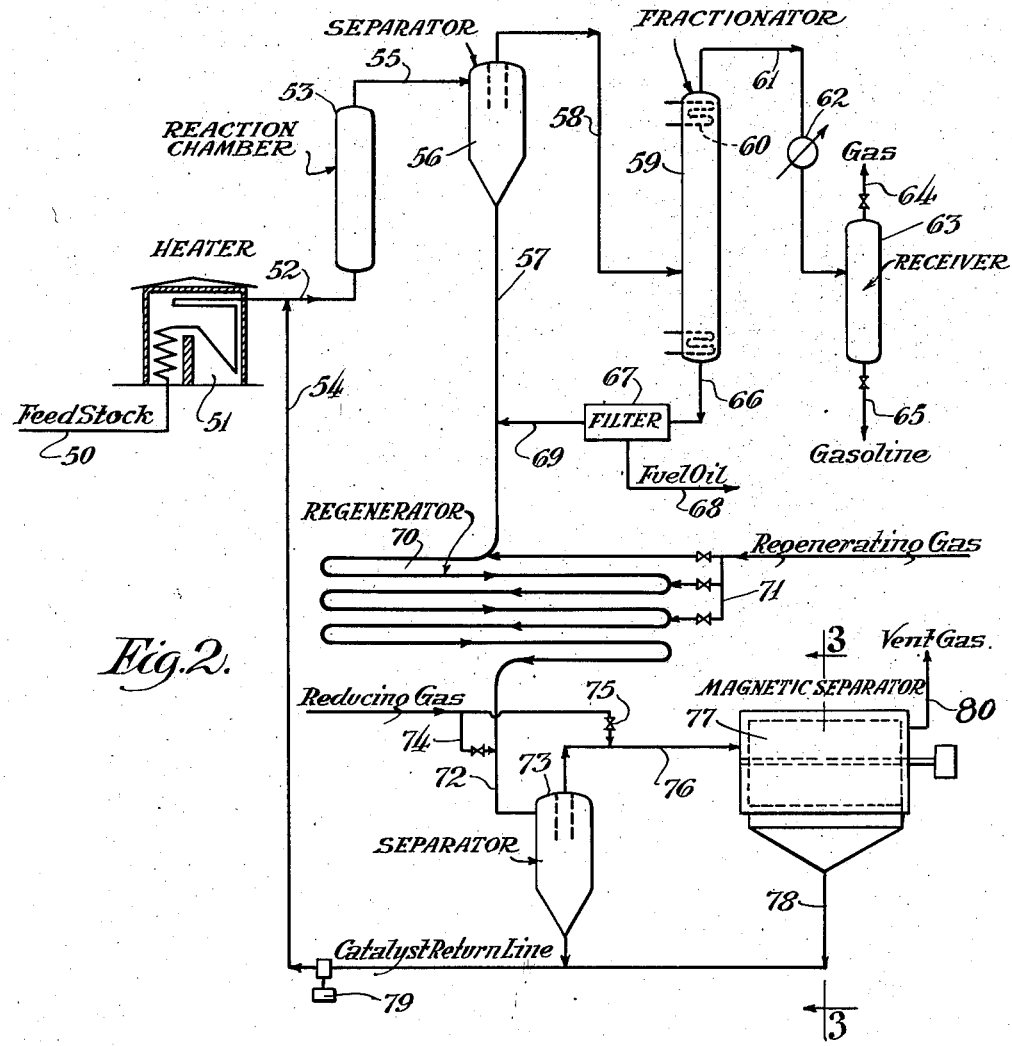
Figure 3:
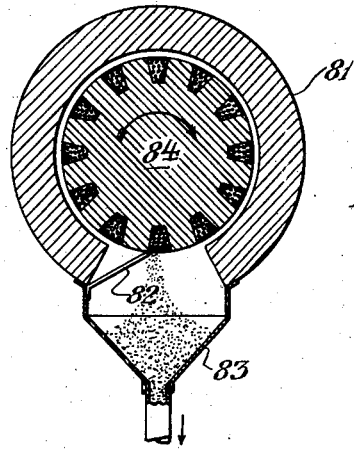

Our invention is illustrated by drawings in which Figure 1 shows a layout of a catalytic cracking plant employing magnetic separators to recover catalyst from the gases after the reaction zone and also after the regeneration zone. Figure 2 shows a somewhat different form of the catalytic cracking process in which magnetic separation means are employed for recovering catalyst from the spent regeneration gases. Figure 3 shows, on a larger scale, a cross section on the line 3—3 taken through the magnetic separator shown in Figure 2.

Referring to Figure 1, feed stock which may be gas oil such as virgin Mid-Continent gas oil is introduced by line 10 and pump 11 to pipe still 12 where it is heated and vaporized and discharged through transfer line 13 to reaction chamber 14. Powdered catalyst is added in a regulated stream under pressure from supply 15 and line 16 to the oil stream either before or after the still 12. The amount of catalyst usually employed varies from about 0.5 to 10 parts by weight per part of oil treated, although considerably less catalyst may be employed, for example, about 2 to 4 pounds per barrel of stock treated may be used in some cases. Pressure to force the fluid catalyst through line 16 may be supplied by a screw pump, a tower or other pressuring device not shown.

In reaction zone 14, there is a tendency for the catalyst to concentrate or accumulate as a result of settling, thus increasing the amount of catalyst in contact with oil vapors and the time of exposure of the catalyst to the oil, the catalyst and oil leaving chamber 14 by line 17 passing through cyclone separator 18 and thence by line 19 to magnetic separator 20. Catalyst separated out in separators 18 and 20 are conducted by lines 21 and 22 respectively to catalyst stripper 23 where any hydrocarbon vapors remaining in the catalyst are removed by a current of inert gas such as steam, nitrogen, etc. The spent stripping gas used for this purpose is withdrawn by line 24 leading to line 19. Vapors from separator 20 are conducted by line 25 to fractionating tower 26 wherein the converted vapors are separated into gasoline, cycle oil and fixed gases, the gasoline and fixed gases being discharged by line 27 while the heavier oils are discharged by line 28. A part or all of the heavier oils obtained in this way may be further cracked in the process by recycling or they may be used for other purposes, such as fuel oil or as charging stock or in other catalytic or non-catalytic (thermal) conversion processes.

In stripper 23 the catalyst is freed of volatile hydrocarbon products by stripping with a current of inert gas such as for example steam introduced by line 29. From the bottom of the stripper the catalyst then passes by lines 30 and 31 to the regenerating zone 32 where non-volatile carbonaceous deposits are removed from the catalyst by combustion with oxygen-containing gas admitted by line 33. The regenerating gas may suitably be air or more particularly air diluted with flue gas to control the oxygen concentration. Heat liberated may be removed by cooling coil 32—a.

Inasmuch as the activity of the catalyst will not usually be completely spent in the reaction, a part of the catalyst may be recycled without regeneration, employing lines 34 and 35 for this purpose, or before stripping by line not shown.

Regenerated catalyst suspended in regeneration gases is conducted by line 36 to cyclone separator 37 where the bulk of the regenerated catalyst is removed mechanically by gravity and by centrifugal action and conducted by line 35 back to the catalyst supply drum 15. The gases still carrying some of the finer catalyst in suspension are withdrawn from separator 37 by line 38 leading to magnetic separator 39. Recovered catalyst from the separator is passed by line 40 to line 35 for recycling to the system.

In order to operate our process successfully, it is essential that the catalyst be magnetic or contain a magnetic substance such as iron, nickel, etc., completely distributed in the catalyst in such a way that all particles are thereby rendered magnetic. Finely divided metallic iron, such as reduced iron powder, iron particles, etc., may be used for the purpose, the iron particles being coated with the catalyst. Iron or nickel oxide may be added to the catalyst and reduced to the metallic form before entering magnetic separator 39. In order to insure that the magnetic substance be in the metallic form before magnetic separation, we prefer to conduct the regeneration of the catalyst in a controlled amount of oxygen sufficient to ignite and burn away a large part of the carbon deposit on the catalyst but insufficient to oxidize the iron to a non-magnetic oxide. Oxidation of iron to the form $Fe_3O_4$, however, is not particularly objectionable because the magnetic properties of this oxide cause it to be attracted by a magnetic field and removed from the gases in separator 39.

If oxidation of the catalyst in regenerator 32 is too extensive, reduction of the iron contained therein may be effected by introducing a reducing gas such as hydrogen, methane, ethane, ethylene, etc., by line 41. Rapid reduction of the iron takes place at the high temperature of the gases leaving the regenerating zone where regeneration is usually conducted at temperatures between 950 and 1200° F. It is only necessary to add sufficient reducing gas to line 41 to reduce that portion of the iron in the catalyst which is associated with the most finely divided catalyst particles, i. e., those catalyst particles which have the greatest tendency to escape the system with the spent regenerating gases. Spent regenerating gases after passing through the magnetic field of separator 39 are discharged from the system by line 42. A portion of these spent gases may be recycled as diluent gases for mixing with oxygen to provide the regenerating gas supplied by line 33.

Figure 2 shows a modification of our process by which magnetic separation catalyst is applied only to the treatment of regeneration gases and oil scrubbing is employed to recover the catalyst from the reaction stage of the process. Referring to Figure 2, oil is introduced by line 50 to heater 51 where it is heated to a conversion temperature, for example, 800 to 1100° F., the hot oil vapors leaving the heater through transfer line 52 and vertical reaction chamber 53. The catalyst is admitted by line 54 and passes upward through the reaction chamber with the oil vapors in the form of a fine suspension. It is preferred to regulate the vapor velocity in chamber 53 to permit partial sedimentation or settling of the catalyst, thereby increasing the time during which the catalyst is exposed to the oil vapors.

Catalyst and vapors are conducted by line 55 to cyclone separator 56 wherein a large part of the catalyst, comprising the heavier particles, is separated and withdrawn by line 57. Vapors and remaining catalyst are passed by line 58 to fractionating tower 59, equipped with bubble plates or other contacting device, where they are subjected to the refluxing action of reflux condensate condensed by coil 60 or pumped back as a spray to more effectively scrub catalyst from the vapors. Gasoline vapors and gases are conducted by line 61 to condenser 62 and receiver 63 from which fixed gases are discharged by line 64 and gasoline is withdrawn by line 65.

Reflux condensate heavier than gasoline is withdrawn from fractionator 59 by line 66 and the catalyst may be recovered by settling or filtration. A filter 67 is shown diagrammatically in the drawing, the oil being discharged by line 68 and catalyst by line 69. An enclosed disc or drum type filter may be used for this purpose. The oil is suitable for fuel purposes or as a charging stock to a pyrolytic cracking process.

The spent catalyst in line 57 and recovered substantially oil-free catalyst in line 69, are conveyed to catalyst regenerator 70. The regenerator may consist of a succession of coils or tubes cooled by an air bath, a fused salt bath, or other temperature cooling means, the coils being connected to a regeneration gas header 71. Regeneration gases containing oxygen, generally about 1 to 5%, are introduced into the catalyst stream passing through regenerator 70, the carbonaceous matter being thereby removed from the catalyst by combustion at temperatures generally within the range of 900 to 1200° F. Higher temperatures may be employed with certain catalysts, particularly with the synthetic silica catalysts, temperatures of 1400 to 1600° F. being sometimes permissible. Regenerating gases and hot catalyst in suspension are conducted by line 72 to cyclone separator 73 where a large part, e. g., 75 to 90%, of the catalyst is separated from the gases and recycled to the hydrocarbon conversion system by line 54. Reducing gas, such as hydrogen or methane, may be introduced by line 74 to insure reduction of iron or nickel or other magnetic metal contained in the catalyst. Instead of reducing the catalyst before entering separator 73, we may add the reducing gas by line 75 to the suspension of catalyst and regeneration gases after separation of the major part of the catalyst in separator 73.

Gases and remaining suspended catalyst are conducted by line 76 to magnetic separator 77. The illustration is a cut-away view of this separator showing a revolvable iron armature in a confined space through which the gases are passed. The catalyst separated on the drum is removed by a scraper at the bottom and is conducted by line 78 and pump 79 back to the conversion system by line 54. Regeneration gases, substantially free of catalyst, are discharged by line 80.

Figure 3 is a cross sectional view of the magnetic separator shown in Figure 2, taken through mid-section at 3—3. Referring to this figure, a revolving iron armature 84 is surrounded by field core 81 with sufficient space between the armature and field core to permit the free passage of gases. The armature may be magnetized by permanent magnets or by electromagnetic means. As the catalyst collects on the surface of the armature 84, it is carried by rotation to the bottom of the armature where it is removed by scraper 82 to trough 83 from which it may be discharged by a suitable screw conveyor or other device.

As indicated hereinabove, our process is applicable to those catalytic reactions where powdered catalysts having ferro-magnetic properties are employed in highly dispersed form in gases and vapors. Reactions such as the synthesis of ammonia by catalytic reaction of nitrogen and hydrogen under high pressure, the synthesis of methanol from carbon oxides and hydrogen, the synthesis of hydrocarbons from carbon monoxide by the Fischer process, catalytic polymerization of hydrocarbon gases as well as the catalytic cracking of heavy hydrocarbon oils to produce gasoline may be considered.

For the catalytic conversion of naphthas and heavy hydrocarbons, we may employ naturally occurring siliceous materials such as the bentonite clays, fuller's earth, etc., suitably activated by chemical treatment such as treatment with acid and with various promoters. Where the mineral is not naturally ferromagnetic, it may be treated with a relatively small amount, e. g., 1 to 10%, of iron or nickel salt, iron oxide, etc., to confer the desired magnetic properties. More complete dispersion of the magnetizing material on the catalyst particles is obtained by the use of salts, for example, iron nitrate or nickel nitrate followed by conversion to the oxide by heating or to the hydroxide by precipitation with ammonia. The oxide may subsequently be reduced at elevated temperature by reducing gases such as hydrogen to the metallic form before the magnetic separation step.

In general, the gases bearing the suspended catalyst will be cooled in the process below the temperature at which the magnetic metal associated with the catalyst loses a substantial amount of its magnetic susceptibility. However, where the gases are not already at a temperature below the point of serious loss of magnetic susceptibility, we may employ additional means for cooling the gas stream before magnetic separation. Where iron is employed as the associated magnetic metal, the gas stream may enter the magnetic separator at a higher temperature than in the case of most of the magnetic metals.

In the case of synthetic catalyst such as silica precipitated from sodium silicate solution, alumina, magnesia, zirconia, zinc oxide, etc., iron or nickel or other magnetic elements may be distributed uniformly throughout the powdered catalyst by coprecipitation from salt solutions, for example, iron sulfate solution may be added with acid to a dilute solution of sodium silicate, employing sufficient acid to adjust the pH between about 5 to 8. The hydrated silica precipitate obtained in this way will contain iron uniformly distributed throughout and be thereby rendered magnetic when in the reduced condition as described in the performance of our process. Where used in this application, the term "magnetic" means ferromagnetic and not diamagnetic.

While we have shown one form of magnetic separator various other forms will readily occur to those skilled in the art and can be employed without departing from our invention.

The flow diagrams used to illustrate our invention are highly simplified and it will be apparent to those skilled in the art that additional valves, pumps, control devices, heating and cooling means, etc. can and should be employed. Further, while we have described our invention in connection with certain illustrative embodiments thereof these are by way of example rather than by way of limitation and we do not mean to be restricted thereto but only to the scope of the appended claims.

Having thus described our invention, what we claim is:

1. In the process of converting hydrocarbon oils by the action of solid refractory siliceous catalysts in finely divided form, wherein a catalyst containing a magnetic element is dispersed in the oil vapors, heated to conversion temperature to effect the desired conversion, thereby contaminating the catalyst with carbonaceous deposits, separated from the oil vapors, regenerated by treatment with oxidizing regeneration gases to remove carbonaceous deposits and thereafter separated from said regeneration gases and recycled to the conversion step while still hot, the improvement comprising separating the major part of the regenerated catalyst from the spent regeneration gases in an initial separation zone by means of the difference in density between the catalyst and the gases, and recovering additional catalyst from the regeneration gases by passing regeneration gases from said initial separation zone into a zone containing a reducing atmosphere, then through a magnetic field in which the particles of catalyst are attracted and flocculated.

2. The process of claim 1 wherein the said magnetic element is iron.

3. The process of claim 1 wherein the said magnetic element is nickel.

4. The process of claim 1 wherein said catalyst is an acid treated argillaceous earth impregnated with metallic iron.

5. In the process of converting hydrocarbon oils by the action of solid refractory siliceous catalysts in finely divided form wherein a catalyst containing a magnetic element is dispersed in the oil vapors, heated to conversion temperature to effect the desired conversion, thereby contaminating the catalysts with carbonaceous deposits, separated from the oil vapors, regenerated by treatment with oxidizing regeneration gases to remove carbonaceous deposits and thereafter separated from said regeneration gases, the improvement comprising increasing the recovery of catalyst powder from said waste regeneration gases by subjecting the regenerated catalyst suspended in said waste regeneration gases to the action of reducing gases thereby effecting conversion to the metallic state of magnetic elements contained in said catalyst and then passing said regeneration gases thru a magnetic field in which the particles of said catalyst are attracted and flocculated.

6. The process of converting hydrocarbon oils comprising contacting the vapors of said oils at a high conversion temperature above 800° F. with a suspension of finely divided highly dispersed contact catalyst having magnetic properties, separating the catalyst from said oil vapors by difference in density, subjecting said catalyst in suspension to the oxidizing action of diluted air whereby carbonaceous deposits are consumed and eliminated from said catalyst, separating a major portion of the catalyst in suspension in said regeneration gases by difference in density, separating substantially all the remaining catalyst from said gases by treating them at elevated temperatures with reducing gases, thereby increasing the magnetic properties of the catalyst and then passing the suspension of catalyst and gases thru a magnetic field wherein catalyst particles are attracted and recovered from said gases.

7. In the process of conducting catalyzed reactions wherein a finely divided solid catalyst having magnetic properties is employed in the reaction until its activity becomes diminished by contamination after which it is regenerated in suspension in an oxidizing regeneration gas and recovered from the regeneration gas, the improvement comprising recovering catalyst from spent regeneration gas by subjecting it to the action of reducing gases while in suspension in said regeneration gas, thereby effecting conversion to the metallic state of magnetic elements contained in said catalyst and thereafter recovering the catalyst from said gases by passing them through a magnetic field in which the particles of catalyst are attracted.

WILLARD G. ROESCH.
FRANK G. BRUECKMANN.